525-354 SR TED FOR MISSING COPY
OR RE 556 -354
Search Re

UNITED STATES PATENT OFFICE.

H. B. GOODYEAR, OF NEW YORK, N. Y., ADMINISTRATOR OF N. GOODYEAR, DECEASED.

IMPROVEMENT IN MANUFACTURE OF HARD RUBBER.

Specification forming part of Letters Patent No. 8,075, dated May 6, 1851; Reissue No. 556, dated May 18, 1858.

Re 556

DIVISION A.

*To all whom it may concern:*

Be it known that NELSON GOODYEAR, late of the city, county, and State of New York, now deceased, did in his lifetime invent a new and useful Improvement in the Preparation and Manufacture of Caoutchouc, producing thereby a substance not before known, for which said invention Letters Patent of the United States were granted to the said NELSON GOODYEAR, bearing date the 6th day of May, 1851; that the said Letters Patent are believed to be inoperative by reason of a defective and insufficient description and specification, which defects and insufficiencies have arisen from inadvertence and mistake and without any fraudulent intention; and that the following is a full, clear, and exact description of the said invention, distinguishing it from all other things before known, and of the manner of working the same, so as to enable any one skilled in the art of vulcanizing india-rubber or other allied gums to work the said process and produce the said substance or manufacture and use the same.

The invention of the said NELSON GOODYEAR relates to an improvement in the process of preparing india-rubber and other vulcanizable gums described in Letters Patent reissued to Charles Goodyear on the 25th day of December, 1849, on the surrender of Letters Patent granted to him by the United States, and bearing date the 15th day of June, 1844, by which said improved process a new substance is produced very distinct in character from the substance produced by the said invention of Charles Goodyear, and applicable to different purposes. The object of the said NELSON GOODYEAR was to produce from caoutchouc a substance or manufacture possessing properties suitable for making, by molding or otherwise, a great variety of articles used in the arts, and which, prior to his said invention, could only be wrought, at great expense, of ivory, bone, tortoise-shell, horn, whalebone, and other like substances. He was aware that by the vulcanizing process invented by and patented to Charles Goodyear on the 15th day of June, 1844, and reissued on an amended specification bearing date the 25th day of December, 1849, a new substance was produced by subjecting india-rubber or allied gums and sulphur (and occasionally other ingredients) in admixture to a high degree of artificial heat, and that this new substance so produced possessed, in addition to the valuable natural properties of the native gum or gums, improved new properties valuable in the arts; but although many of these properties were considered by the said NELSON GOODYEAR important to be possessed by the material which he desired to produce, yet, as the product of the invention of Charles Goodyear was soft and pliable and only elastic when stretched or compressed, it was obvious that, although eminently useful for the uses contemplated by the inventor, Charles Goodyear—such as wearing-apparel, car-springs, door-springs, packing for steam-joints, &c., where pliability and its other qualities were important—it was wholly unsuited to the purposes contemplated by the said NELSON GOODYEAR, from the want of the hardness and beauty, when finished, of the ivory and the other substances named, and of the spring-like property, under flexure, peculiar to whalebone. In view of the properties desired and the manner of production, the improvement of the said NELSON GOODYEAR consists in thoroughly mixing india-rubber or other vulcanizable gum with sulphur, whether with or without auxiliary ingredients, in the proportion of about from four ounces to a pound of sulphur to a pound of the gum, and then subjecting the same to a high degree of artificial heat, as in the said vulcanizing process of Charles Goodyear, until the compound shall have acquired the required hard and tough property found in various degrees in ivory, bone, tortoise-shell, and horn, and the spring-like property, under flexure, found in whalebone.

To enable any one skilled in the art of vulcanizing caoutchouc to work the said invention of NELSON GOODYEAR, I will describe the mode of procedure.

The india-rubber or any of the allied gums which are known to be vulcanizable by the before-named process of Charles Goodyear is thoroughly mixed with sulphur, as for the well-known vulcanizing process, but in different proportions, as in the working of the said vulcanizing process of the said Charles Goodyear the best results are obtained by the use of the smallest proportional quantity of sulphur which will suffice to produce the change termed "vulcanization," and which is usually not over one ounce of sulphur to a pound of gum, while so small a proportional quantity of sulphur would entirely fail of producing the result obtained by the improved process of the said NELSON GOODYEAR. After the gum and sulphur have been thoroughly incorporated, and while the compound is in a plastic state, it may be rolled into sheets or put into any form desired by molding or otherwise, and then, whether in molds or otherwise, subjected to a high degree of heat, which should not be less than from 260° to 275° of Fahrenheit scale, in a steam or other heater, and kept there about six hours or more—that is, until the compound substance has attained the required degree of hardness; and, although india-rubber or other allied gum and sulphur in suitable proportions will produce the new manufacture or substance suited to a great variety of purposes, and which will be capable of receiving the highest degree of polish, a still cheaper, and for many purposes a better, substance will be produced by the addition of other ingredients—such as magnesia or lime, or the carbonate of magnesia or of lime, or the sulphate of magnesia or of lime—in which case the mixture may be made in the proportion of one pound of gum to a half a pound of sulphur and a half a pound of either of the other ingredients named; and, in short, with the view to economy, and to vary the texture in degree, and to impart various colors, other ingredients may be incorporated, such as gum-lac, (gum-shellac,) rosin, oxides or salts of lead or zinc, and other similar substances, whether mineral or vegetable. If gum-lac be introduced, it should be in the proportion of from four to eight ounces to the pound of india-rubber or allied gum. The various additional or auxiliary ingredients only affect the product in degree, as the character of the new manufacture or substance is dependent upon the use of caoutchouc and a sufficient proportional quantity of sulphur and a sufficiently high degree of heat continued long enough to induce the change indicated, and although much latitude may be taken in the proportional quantity of sulphur, a proportion much less than four ounces to the pound of caoutchouc will utterly fail to produce the new substance or manufacture hereinabove described. It is well known that it has been proposed to produce a hard substance from caoutchouc by passing it through highly-heated liquid sulphur; but this has not been attended with practical success.

I do not wish to be understood, however, as making claim, broadly, to the union of caoutchouc and sulphur in the proportions named, however these substances may be united and treated; but What I do claim as the invention of the said NELSON GOODYEAR, and desire to secure by Letters Patent, is—

The combining of sulphur and india-rubber or other vulcanizable gum, in proportion substantially as specified, when the same is subjected to a high degree of heat, substantially as specified, according to the vulcanizing process of Charles Goodyear, for the purpose of producing a substance or manufacture possessing the properties or qualities substantially such as described, and this whether the said compound of sulphur and gum be or be not mixed with other ingredients, as set forth.

H. B. GOODYEAR,
*Administrator of Nelson Goodyear, deceased.*

Witnesses:
WM. H. BISHOP,
WM. C. BROWN.